United States Patent

Karrer

[11] 3,884,941
[45] May 20, 1975

[54] EPOXY CONTAINING ACYLATED TERPENOID AMINES

[75] Inventor: Friedrich Karrer, Basel, Switzerland

[73] Assignee: Ciba-Geigy AG, Basel, Switzerland

[22] Filed: Oct. 17, 1973

[21] Appl. No.: 407,111

Related U.S. Application Data

[62] Division of Ser. No. 155,602, June 22, 1971, Pat. No. 3,786,097.

[30] Foreign Application Priority Data

June 26, 1970 Switzerland.............................. 9706
June 26, 1970 Switzerland............................ 14890

[52] U.S. Cl...... 260/348 A; 260/240 H; 260/348 R; 424/278
[51] Int. Cl. .......................... C07d 1/00; C07d 1/06
[58] Field of Search................................ 260/348 A

[56] References Cited
UNITED STATES PATENTS
3,429,970  2/1969  Ruegg et al......................... 424/333
3,453,362  7/1969  Cruickshank........................ 424/84

Primary Examiner—Norma S. Milestone
Attorney, Agent, or Firm—Harry Falber; Frederick H. Rabin

[57] ABSTRACT

New terpenoid compounds and use thereof for influencing the development of insects and representatives of the order Acarina are disclosed. The compounds correspond to the formula

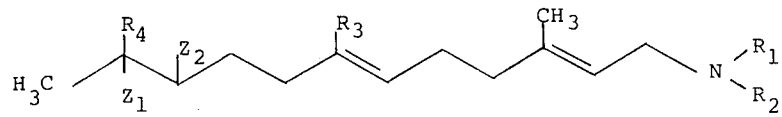

wherein $Z_1$ and $Z_2$ are each hydrogen or together form a carbon carbon bond or an oxygen bridge,
$R_1$ is $C_2$–$C_4$ alkenyl or acyl,
$R_2$ is $C_1$–$C_4$ alkyl or $C_2$–$C_4$ alkenyl, and
$R_3$ and $R_4$ are each methyl or ethyl.

3 Claims, No Drawings

EPOXY CONTAINING ACYLATED TERPENOID AMINES

This application is a division of copending application Ser. No. 155,602 filed June 22, 1971, now U.S. Pat. No. 3,786,097.

This invention relates to new terpenoid compounds and their use in influencing the development of insects and representatives of the order Acarina.

According to the present invention there are provided compounds of the general formula I

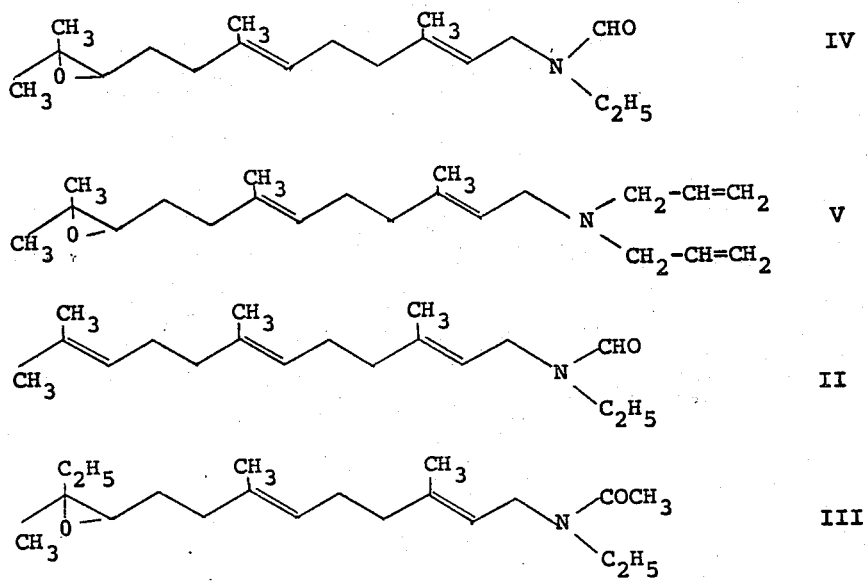

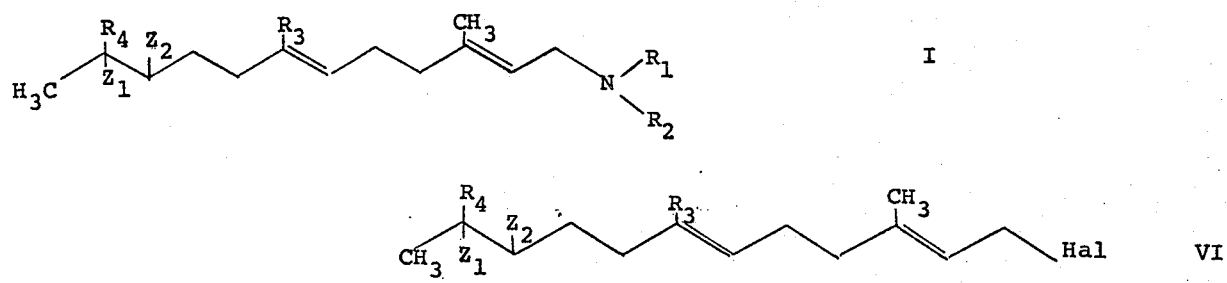

wherein
  $Z_1$ and $Z_2$ are each hydrogen or together form a carbon carbon bond or an oxygen bridge,
  $R_1$ is $C_2 - C_4$ alkenyl or acyl,
  $R_2$ is $C_1 - C_4$ alkyl or $C_2 - C_4$ alkenyl, and $R_3$ and $R_4$ are each methyl or ethyl.

The $C_1 - C_4$ alkyl or $C_2 - C_4$ alkenyl groups which $R_1$ and $R_2$ may represent can be straight or branched chain, and substituted or unsubstituted. Examples of such groups are, inter alia, methyl, ethyl, propyl, isopropyl, n-, i-, secondary- or tertiary- butyl, allyl, chlorallyl, crotyl, methallyl, etc.

The acyl groups which $R_1$ may represent can be substituted or unsubstituted and saturated or unsaturated, and are derived mostly from lower carboxylic acids, particularly mono carboxylic acids. Representatives of such are for example formic acid, acetic acid, mono-, di-, and trichloro acetic acid, mono-, and dibromo acetic acid, trifluoro acetic acid, propionic acid, α-chloropropionic acid, α,α-dichloropropionic acid, α,β-dichloropropionic acid, α,α-dibromopropionic acid, α,β-dibromopropionic acid, butyric acid, α-bromobutyric acid, isobutyric acid, acrylic acid, methacrylic acid, crotonic acid, cyclopropanecarboxylic acid, cyclobutanecarboxylic acid and substituted or unsubstituted benzoic acids.

Of particular importance are compounds of the formulae:

The manufacture of the compounds of Formula I takes place in known fashion by the reaction of a mixture of geometrical isomers of the Formula wherein Hal is halogen, preferably bromine or chlorine, and $Z_1$ and $Z_2$ are hydrogen or together are a carbon carbon bond, and $R_3$ and $R_4$ have the meaning given in Formula I, with a primary or secondary amine of the Formula

wherein $R_1$ and $R_2$ have the meaning as given for Formula I with the exception of acyl groups, preferably with cooling in an inert solvent medium, and thereafter if desired epoxidation with 1 mole of a selective epoxidizing agent such as a peracid, in an inert solvent medium such as, for example, a halogenated hydrocarbon.

By the term "peracid," it is intended to mean primarily low peralkane acids with one to six carbon atoms such as for example peracetic acid, as well as aromatic peracids such as perbenzoic acid, and monoperphthalic acid. m-Chlorobenzoic acid is especially preferred.

For epoxidizing non acylated amines ($Z_1$ and $Z_2$ forming together a carbon carbon bond in Formula I) the amino group is protected during the process by salt formation with an acid before the oxidative influence of the epoxidizing agent. Acids used in this connection can be mineral or organic acids such as formic acid, halogenated aliphatic carboxylic acids, particularly trifluoroacetic acid and trichloroacetic acid.

For manufacturing the acylated compounds of Formula I, a secondary amine of the Formula

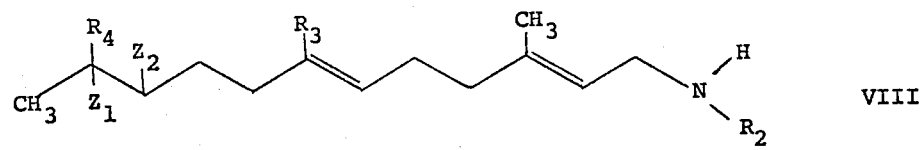

wherein $Z_1$, $Z_2$, and $R_2$–$R_4$ have the meaning given in Formula I, is reacted in known fashion with an acylating agent, for example a carboxylic acid, carboxylic acid anhydride or carboxylic acid halide, optionally in the presence of a base.

Finally, in the above described fashion, the selective epoxidation can be carried with 1 mole of a peracid in an inert solvent medium such as a halogenated hydrocarbon, preferably with cooling.

The introduction of the epoxy group into the acylated amines can, apart from with a peracid, take place also by transfer of the compounds of Formula I (wherein $Z_1$ and $Z_2$ together form a carbon carbon bond), with N-bromosuccinimide in a mixture of water with a suitable solvent medium such as tetrahydrofurane, 1,2-dimethoxyethane, dioxane, or with tertiary butanol in bromohydrin, and the transformation into an epoxide of Formula I (wherein $Z_1$ and $Z_2$ together form an oxygen bridge) takes place with the aid of a basic reagent such as an alkali carbonate or an alkali alkoxide. By alkali, particularly sodium and potassium are to be understood.

The compounds described are prepared as mixtures of the geometrical isomers as result of the synthesis. The starting materials of Formula VI to VIII are known compounds which can be manufactured by known methods described in the literature.

The novel compounds of Formula I give a partial or complete inhibition of the growth of insects and representatives of the order Acarina (mites) by means of which a transition from one development stage into the next is to be understood. In the case of a development transition on the Embryonic to the Larval stage and from the Pupa or last Larval into the imaginal stage, the contact with an effective quantity of the compound of the invention in the first stage inhibits the transition to the next stage of development, whereon the insects either remain in their development stage at the time or die. The compounds are also effective as ovicides. The compounds according to the invention are exceptionally active and can be used in very small doses of $10^{-5}$ to $10^{-9}$ grams per insect.

The compounds according to the invention may be used, for example, against all pest insects such as aphids, such as the peach potato aphid (Myzus persicae), the black bean aphid (Aphis fabae); Scale insects such as Aspidiotus hederae, Lecanium hesperidium, Pseudococcus maritimus; Thysanoptere (thrips) such as Herciothrips femoralis, and bugs such as the beet-bug (Piesma quadratum) or the bed bugs (Climex Lectularius); butterfly grubs such as Plutella maculipennis, Lymantria dispar and grubs of the genus Prodenia; beetles such as Colorad beetle (Leptinotarsa decemlineata); Orthoptera such as the house cricket (Acheta domesticus); Termites such as Reticulitermes; Hymenoptera, such as ants; flies such as the fruit fly Drosophila melanogaster, and the mediterranean fruit fly (Ceratitis capitata), the house fly (Musca domestica), as well as mosquitoes, e.g. Aedes aegypti and Anopheles stephensi.

Further important pest insects are for example: Tineola biselliella, and Carpocapsa pomonella.

Of particular mention under pest insects are stored product pests, of which the following are to be noted as exemplary. They are all important stored product pests:

Oryzaephilus surinamensis
Trogoderma granarium
Lasioderma sericorne
Chryptolestes ferrugineus
Stegobium paniceum
Neocrobia rufipes
Anthresus vorax
Sitophilus granarius
Sitophilus oryzae
Sitophilus zea mais
Rhizoptera dominica
Acanthoscelides obtectus
Ephestia kuehniella
Araeocerus fasciaslatus
Carpophilus hermipterus
Tenebrio molitor
Tribolium castaneum
Tribolium destructor
Tribolium contusum
Athagenus piceus The compounds of Formula I are also suitable for combatting representatives of the order Acarina such as of the families Ixodidae; Argasidae; Tetranychidae; Dermanyssidae.

The compounds of Formula I can be used alone or together with suitable carriers and/or other additive materials.

Suitable carriers and additives can be solid or liquid and correspond to the customary materials used in formulation techniques such as for example natural or regenerated mineral materials, solution, dispersion, wetting, adhesive, thickening, binding and composting agents. Furthermore, further biocidal compounds can be added thereto. Such biocidal compounds can be, for example, from the class of ureas, saturated or unsaturated halo fatty acids, halobenzonitriles, halobenzoic acids, phenoxyalkyl carboxylic acids, carbamates, triazines, nitroalkylphenols, organic phosphorus compounds, quaternary ammonium salts, sulfaminic acids, arsenates, arsenites, borates, and chlorates.

For the purposes of application the compounds of the Formula I can be treated to form dusting agents, emulsion concentrates, granulates, dispersions, sprays, solutions or slurries in customary formulation, which is all part of the general knowledge of application techniques.

For the manufacture of directly sprayable solution for compounds of Formula I, there should be noted particularly mineral oil fractions of high to average boiling range, such as diesel oil or kerosene, coal tar oils and oils of vegetable or animal origin, together with hydrocarbons such as alkylated naphthalene, tetrahydronaphthalene, optionally with the use of xylene mixtures, cyclohexane, ketones, and furthermore chlorinated hydrocarbons, such as trichlorethane and tetrachlorethane, trichloroethylene or tri- and tetrachlorobenzenes. It is advantageous to use organic solvent media the boiling point of which is over 100°C.

Aqueous preparations are particularly suitable as emulsion concentrates, pastes or wettable, sprayable powders which are prepared for use by the addition of water. As dispersing agents there should be noted the non-ionogenic products, e.g. condensation products of aliphatic alcohols, amines or carboxylic acids with a long chain hydrocarbon group from about 10 to 20 carbon atoms and ethylene oxide, such as the condensation product of octadecyl alcohol and 25 to 30 mols of ethylene oxide, or that of soya fatty acids and 30 mol ethylene oxide, or that of technical oleyl amine and 15 mol ethylene oxide or that of dodecylmercaptan and 12 mol ethylene oxide. Under anion active dispersing agents which can be used there should be mentioned for example, the sodium salt of dodecyl alcohol sulfuric acid ester, the sodium salt of dodecylbenzenesulphonic acid, the potassium or triethanolamine salts of oleic acid or abietic acid or mixtures of these acids or the sodium salt of a petroleum sulfonic acid. As cation active dispersing agents, there can be used quaternary ammonium compounds such as cetylpyridiumbromide or dioxyethylbenzyldodecyl ammonium chloride.

In the manufacture of dusting and spreading agents, there can be used as solid carrier materials talcum, kaolin, bentonite, calcium carbonate, and even coal, cork flour, wood flour, and other materials of vegetable origin. Particularly useful is the manufacture of preparations in granulated form. The various application forms can include in known fashion of material which improve the distribution, the adherence, the rain resistance or the impregnation ability thereof; such materials are for example fatty acids, resins, glues, casein, or alginates.

The following Examples will serve to illustrate the invention:

EXAMPLE 1

A mixture of 22 g 1-bromo-3,7,11-trimethyl-2,6,10-dodecatriene and 20 ml diethylether was added dropwise at about −4°C within one hour to 22g of freshly distilled diallylamine. The mixture was then stirred for 1 hour at 0°C and 20 hours at room temperature. After dilution with diethylether the reaction mixture was first washed three times with 40 ml of 20% aqueous caustic potash and then several times with water. The ether solution of the tertiary base was dried over sodium sulfate, the solvent removed under vacuum and the remaining N,N-diallyl-3, 7,11-trimethyl-2,6,10-dodecatrienylamine distilled under high vacuum. B.Pt. 123°–124°C/0.01 Torr; $n_D^{20}$ : 1.4896.

EXAMPLE 2

A mixture of 14.3 g 1-bromo-3,7,11-trimethyl-2,6,10-dodecatriene and 10 ml diethylether was added dropwise within an hour with stirring at 0°C to 20 g of di-(2-chloroallyl)amine. The mixture was then stirred for 20 hours at room temperature. The reaction mixture was then treated as noted in Example 1 and the N,-N-di-(2-chloroallyl)-3,7,11-trimethyl-2,6,10-dodecatrienylamine remaining was purified by chromatography on aluminium oxide, (elutriation agent-:methylacetate: hexane 1:12). $n_D^{20}$ : 1.5050.

EXAMPLE 3

At 10°–15°C., 10 ml of acetic acid anhydride were added dropwise with stirring to 13g of N-allyl-3,7,11-trimethyl-2, 6,10-dodecatrienylamine. After 16 hours stirring at room temperature the excess acetic acid anhydride was taken up in 100 ml water, with ice cooling, and the reaction mixture extracted with ether-n-hexane 1:1. The purified ether-hexane phases were washed neutral with saturated aqueous sodium bicarbonate solution. Then, after twice washing with a little water, the mixture was dried over sodium sulfate and the solvent distilled off in vacuo. The remaining N-acetyl-N-allyl-3,7,11-trimethyl-2,6, 10-dodecatrienylamine was purified by chromatography on silica gel with methyl acetate-n-hexane (2:3). $n_D^{20}$ : 1.4968.

EXAMPLE 4

At 0°C, 1.6 ml of trifluoroacetic acid were added to 6.03 g N,N-diallyl-3,7,11-trimethyl-2,6,10-dodecatrienylamine in 60 ml dichloromethane, and then a solution of 4.1 g 86% m-chloroperbenzoic acid in 30 ml dichloromethane-diethylether (9:1) was added dropwise with stirring within 4 hours. After 10 hours stirring at 0°–5°C, the reaction mixture was diluted with hexane, washed thrice with 30 ml of 10% aqueous caustic potash and then washed neutral with water. After drying the organic phase over sodium sulfate, the solvent was distilled off and the product chromatographically purified on aluminum oxide (activity III) (elutriation agent diethylether-n-hexane, 1:9), by means of which colorless N,N-diallyl-10,11-epoxy-3,7,11-trimethyl-2, 6-dodecadienylamine is obtained. $n_D^{20}$ : 1.4847.

EXAMPLE 5

A solution of 5.9 g 86% m-chloroperbenzoic acid in 40 ml dichloromethane-diethyl ether (9:1) was added dropwise with stirring within 3 hours at −2° to 0°C to 8.8 g N-acetyl-N-allyl-3,7,11-trimethyl-2,6,10-dodecatrienylamine in 90 ml of dichloromethane. After a further 24 hours stirring at 0°–2°C, the reaction mixture was diluted with n-hexane, washed thrice at 0°C with 30 ml 10% aqueous caustic potash and then with water. After drying the organic phase over sodium sulfate, the solvent was distilled off and the product purified chromatographically on silica gel (activity III) (elutriation agent, methyl acetate: n-hexane 1:2), by means of which colorless N-acetyl-N-allyl-10, 11-epoxy-3,7,11-trimethyl-2,6-dodecadienylamine was obtained. $n_D^{20}$ : 1.4820.

The following compounds can also be prepared in a manner analogous to that given in Examples 1–5.

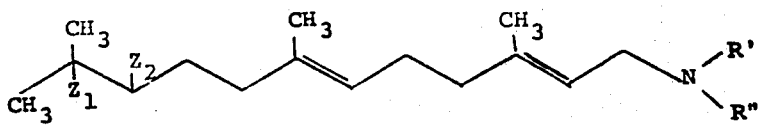
| —N⟨R'/R"⟩ | $Z_1$; $Z_2$ | $n_D^{20}$ : | B.Pt. (°C): |
|---|---|---|---|
| —N⟨CH₂—C(Cl)=CH₂ / CH₂—CH₂—CH₃⟩ | -C-C- | 1,4902 | 78-80°/0,01 Torr |
| —N⟨CH₂—C(CH₃)=CH₂ / CH₂—C(CH₃)=CH₂⟩ | -C-C- | 1,4870 | 130-134°/0,05 Torr |
| —N⟨CH₂—C(CH₃)=CH₂ / CH(CH₃)CH₃⟩ | -C-C- | 1,4822 | 73-75°/0,01 Torr |
| —N⟨CHO / CH₂—CH₃⟩ | -C-C- | 1,4925 | |
| —N⟨CHO / CH₂—CH₃⟩ | -O- | 1,4877 | |

| $-N\begin{matrix}R'\\R''\end{matrix}$ | $Z_1;Z_2$ | $n_D^{20}$ | B.Pt. (°C): |
|---|---|---|---|
| $-N\begin{matrix}CO-CH=CH_2\\ \diagdown\end{matrix}$ | -C-C- | 1,5038 | |
| $-N\begin{matrix}CO-CH=CH_2\\ \diagdown\end{matrix}$ | - O - | 1,4980 | |
| $-N\begin{matrix}CH_2-CH=CH_2\\ CH_2-CH=CH_2\end{matrix}$ | -C- C- | 1,4899 | 109 - 110°/0,01 Torr |

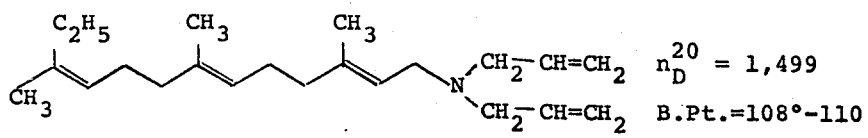

$n_D^{20} = 1,499$
B.Pt.=108°-110

EXAMPLE 6

At 10°–15°C, 10 ml of formic acid were added dropwise with stirring to 13g of N-ethyl-3,7,11-trimethyl-2,6,10-dodecatrienylamine. After 16 hours stirring at room temperature the excess acetic acid anhydride was taken up in 100 ml water, with ice cooling, and the reaction mixture extracted with ether-n-hexane 1:1. The purified ether-hexane phases were washed neutral with saturated aqueous sodium bicarbonate solution. Then after twice washing with a little water, the mixture was dried over sodium sulfate and the solvent distilled off in vacuo. The remaining N-formyl-N-ethyl-3,7,11-trimethyl-2,6,10-dodecatrienylamine was purified by chromatography on silica gel with methyl acetate-n-hexane (2L3). $n_D^{20}$ : 1.4925.

EXAMPLE 7

At 0°C, 1.6 ml of trifluoroacetic acid were added to 6.03 g N-formyl, N-ethyl-3,7,11-trimethyl-2,6,10-dodecatrienylamine in 60 ml dichloromethane, and then a solution of 4.1 g 86% m-chloroperbenzoic acid in 30 ml dichloromethane, diethylether (9:1) was added dropwise with stirring within 4 hours. After 10 hours stirring at 0°–5°C, the reaction mixture was diluted with hexane, washed thrice with 30 ml of 10% aqueous caustic potash and then washed neutral with water. After drying the organic phase over sodium sulfate, the solvent was distilled off and the product chromatographically purified on aluminum oxide (Activity III) (elutriation agent diethylether-n-hexane, 1:9), by means of which colorless N-formyl, N-ethyl-10-11-epoxy-3,7,11-trimethyl-2,6-dodecadienylamine is obtained.

EXAMPLE 8

A solution of 5.9g 86% m-chloroperbenzoic acid in 40 ml dichloromethane-diethyl ether (9:1) was added dropwise with stirring within 3 hours at −2° to 0°C to 8.8 g N-acetyl-N-ethyl-3,7-dimethyl-11-ethyl-2,6,10-dodecatrienylamine in 90 ml of dichloromethane. After a further 24 hours stirring at 0°-2°C, the reaction mixture was diluted with n-hexane, washed thrice at 0°C with 30 ml 10% aqueous caustic potash and then with water. After drying the organic phase over sodium sulfate, the solvent was distilled off and the product purified chromatographically on silica gel (Activity III) (elutriation agent methyl acetate n-hexane 1:2), by means of which colorless N-acetyl-N-ethyl-10,11-epoxy-3,7-dimethyl-11-ethyl-2,6 dodecadionylamine was obtained.

EXAMPLE 9

Dusting Agent

Equal parts of an active substance of formula I and precipitated silica were finely ground. By mixing with kaolin or talcum, dusting agents with a preferred active agent content of 1–5% could be made therefrom.

Sprayable powder

For making a sprayable powder, the following components, for example, are mixed and finely ground.
- 50 parts active agent according to the invention
- 20 parts highly absorbent silica
- 25 parts bolus alba (Kaolin)
- 1.5 parts 1-benzyl-2-stearyl-benzimidazol-6,3'-disulfonate, sodium salt
- 3.5 parts reaction product of p-tert, octyl phenol and ethylene oxide.

Emulsion concentrate

Well soluble active agents can be formulated as emulsion concentrates according to the following directions:

- 20 parts active agent
- 70 parts xylene
- 10 parts of a mixture of a reaction product of an alkyl phenol with ethylene oxide and calcium dodecylbenzene sulfonate are mixed together. On diluting with water to the desired degree, a sprayable emulsion results.

Granulates 7.5 g of an active substance according to formula I are dissolved in 100 ml acetone, and the acetonic solution so obtained added to 92 g granulated attapulgite. The whole was well mixed and the solvent removed in a rotary evaporator. A granulate of active agent content about 7.5% is obtained.

EXAMPLE 10

Determination of the biological activity of the compounds of Examples 1–3

With the aid of a micro-applicator, solutions of various concentrations of active agent in acetone were applied to 1–24 hour old pupae of Epitachna varivestis. The so treated pupae were kept at 25°C. until the pupal skin was shed, which normally takes 5–6 days. After this time, the following effects of the treatment on the test animals could be determined: the animals were dead or showed positive symptoms; a treatment was considered negative if morphological changes could be determined on neither the treated animals nor on animals from the eggs of the treated animals. Classified as positive, as well as the dead, were all adultoid intermediate forms, which still showed definite features of the pupal stage.

In comparison with untreated control animals, no delay in emergence arose with the treated pupae. 10 animals were treated per concentration of active agent. The inhibiting action of compounds of the following formulae were evaluated in micrograms per pupal from the numbers of dead and positive reacting test animals:

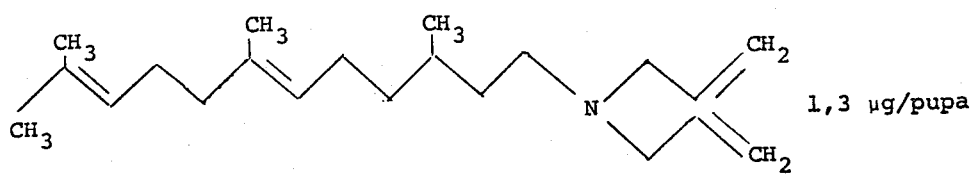
1,3 µg/pupa

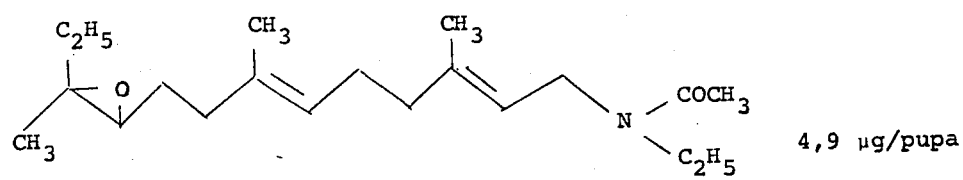
4,9 µg/pupa

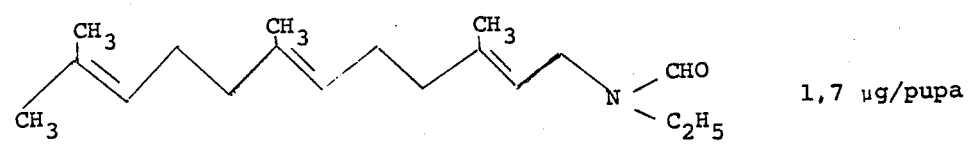
1,7 µg/pupa

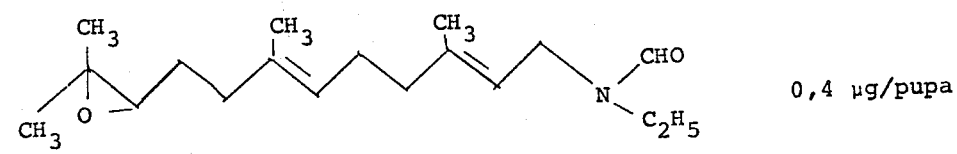
0,4 µg/pupa

What is claimed is:
1. A compound of the formula:
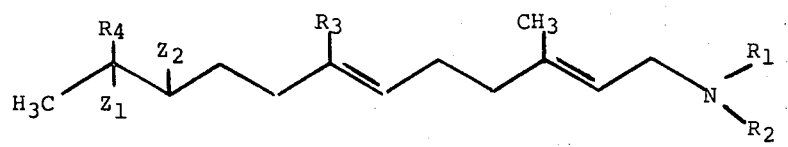
wherein
$Z_1$ and $Z_2$ together form an oxygen bridge,
$R_1$ is acyl,
$R_2$ is $C_1$-$C_4$ alkyl or $C_2$-$C_4$ alkenyl, and
$R_3$ and $R_4$ are each methyl or ethyl.
2. A compound according to claim 1 of the formula:
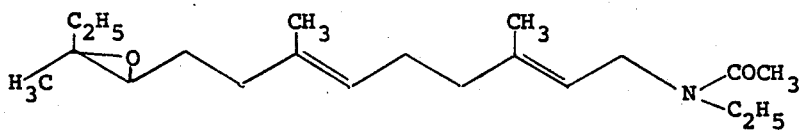
3. A compound according to claim 1 of the formula:
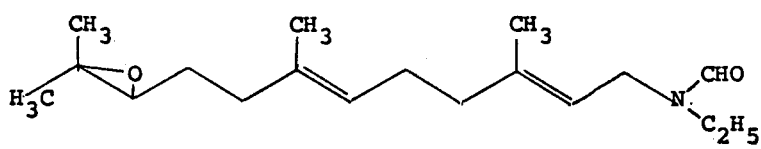
* * * * *

UNITED STATES PATENT OFFICE
CERTIFICATE OF CORRECTION

PATENT NO. : 3,884,941
DATED : May 20, 1975
INVENTOR(S) : Friedrich Karrer

It is certified that error appears in the above-identified patent and that said Letters Patent are hereby corrected as shown below:

Item [30], line 3: delete "June 26, 1970" and in lieu thereof insert -- October 8, 1970 --.

Signed and Sealed this third Day of February 1976

[SEAL]

Attest:

RUTH C. MASON
Attesting Officer

C. MARSHALL DANN
Commissioner of Patents and Trademarks